United States Patent
Hirabayashi

(10) Patent No.: US 11,624,945 B2
(45) Date of Patent: Apr. 11, 2023

(54) DISPLAY DEVICE

(71) Applicant: Japan Display Inc., Tokyo (JP)

(72) Inventor: Ken Hirabayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/558,732

(22) Filed: Dec. 22, 2021

(65) Prior Publication Data

US 2022/0113581 A1 Apr. 14, 2022

Related U.S. Application Data

(63) Continuation of application No. 17/136,205, filed on Dec. 29, 2020, now Pat. No. 11,209,685, which is a continuation of application No. 16/789,157, filed on Feb. 12, 2020, now Pat. No. 10,901,254, which is a
(Continued)

(30) Foreign Application Priority Data

Jun. 28, 2016 (JP) ................. 2016-127413

(51) Int. Cl.
*G02F 1/1333* (2006.01)
*F21V 8/00* (2006.01)
*G02F 1/1335* (2006.01)

(52) U.S. Cl.
CPC ..... *G02F 1/133308* (2013.01); *G02B 6/0088* (2013.01); *G02F 1/133512* (2013.01); *G02B 6/0055* (2013.01); *G02F 1/13332* (2021.01); *G02F 1/133314* (2021.01); *G02F 1/133317* (2021.01); *G02F 1/133322* (2021.01); *G02F 1/133325* (2021.01); *G02F 1/133509* (2013.01);
(Continued)

(58) Field of Classification Search
CPC ................ G02F 1/133317; G02F 1/133308
See application file for complete search history.

(56) References Cited

U.S. PATENT DOCUMENTS

2009/0168314 A1* 7/2009 Park ................. G02F 1/133308
361/679.02
2012/0162569 A1* 6/2012 Sekiguchi ......... G02F 1/133308
349/58
(Continued)

FOREIGN PATENT DOCUMENTS

JP 2006276623 A * 10/2006
KR 20070068717 * 7/2014 ....... G02F 1/133308

OTHER PUBLICATIONS

English translation of JP-2006276623-A Masaaki, published Oct. 2006 (Year: 2006).*
(Continued)

*Primary Examiner* — Evan P Dzierzynski
(74) *Attorney, Agent, or Firm* — Michael Best & Friedrich LLP

(57) ABSTRACT

A display device includes: a panel including a display screen and a side face that extends along a periphery of the display screen; a backlight located on a side of the panel opposite to the display screen to radiate light on the panel; a case, for containing the backlight, including a bottom that faces the panel with the backlight in between and a side wall that stands at a periphery of the bottom and faces the side face of the panel; and a combining member provided between the side face of the panel and the side wall to combine the panel and the case.

16 Claims, 10 Drawing Sheets

Related U.S. Application Data continuation of application No. 15/499,052, filed on Apr. 27, 2017, now Pat. No. 10,598,971.

(52) U.S. Cl.
CPC .... *G02F 2202/023* (2013.01); *G02F 2202/28* (2013.01)

(56) References Cited

U.S. PATENT DOCUMENTS

| | | | | |
|---|---|---|---|---|
| 2014/0176863 A1* | 6/2014 | Oohira | ................ | G02B 6/0088 349/62 |
| 2015/0241731 A1* | 8/2015 | Jeong | ................... | G02B 6/0073 349/58 |
| 2016/0266299 A1* | 9/2016 | Yoon | .................... | G02B 6/0091 |

OTHER PUBLICATIONS

English translation of KR-20070068717 Nam, published Jul. 2014 (Year: 2014).*

* cited by examiner

DISPLAY DEVICE

CROSS-REFERENCE TO RELATED APPLICATIONS

The present application is a Continuation of U.S. application Ser. No. 17/136,205, filed on Dec. 29, 2020, which, in turn, is a Continuation of U.S. application Ser. No. 16/789,157 (now U.S. Pat. No. 10,901,254), filed on Feb. 12, 2020, which, in turn, is a Continuation of U.S. application Ser. No. 15/499,052 (now U.S. Pat. No. 10,598,971), filed on Apr. 27, 2017. Further, this application claims the benefit of priority of the prior Japanese Patent Application No. 2016-127413, filed on Jun. 28, 2016, the entire contents of which are incorporated herein by reference.

FIELD

The embodiments discussed herein relate to a display device.

BACKGROUND

In recent years, display devices are widely used in a smartphone, a personal assistant device (PAD), a tablet computer, a car navigation system, and the like. There is a need for the display devices to make their display regions larger within the same housing size in order to achieve high-definition display, and therefore the frames of the display devices are narrowed by shortening the distance of a non-display part from an outer edge to a display region. Also, light leakage is prevented in the display devices.

See, for example, U.S. Patent Application Publication No. 2015/0241731.

SUMMARY

According to one aspect, there is provided a display device including: a panel including a display screen and a side face that extends along a periphery of the display screen; a backlight located on a side of the panel opposite to the display screen to radiate light on the panel; a case for containing the backlight, the case including a bottom that faces the panel with the backlight in between and a side wall that stands at a periphery of the bottom and faces the side face of the panel; and a combining member provided between the side face of the panel and the side wall to combine the panel and the case.

The object and advantages of the invention will be realized and attained by means of the elements and combinations particularly pointed out in the claims.

It is to be understood that both foregoing general description and the following detailed description are exemplary and explanatory and are not restrictive of the invention.

DESCRIPTION OF EMBODIMENTS

Figure 1:
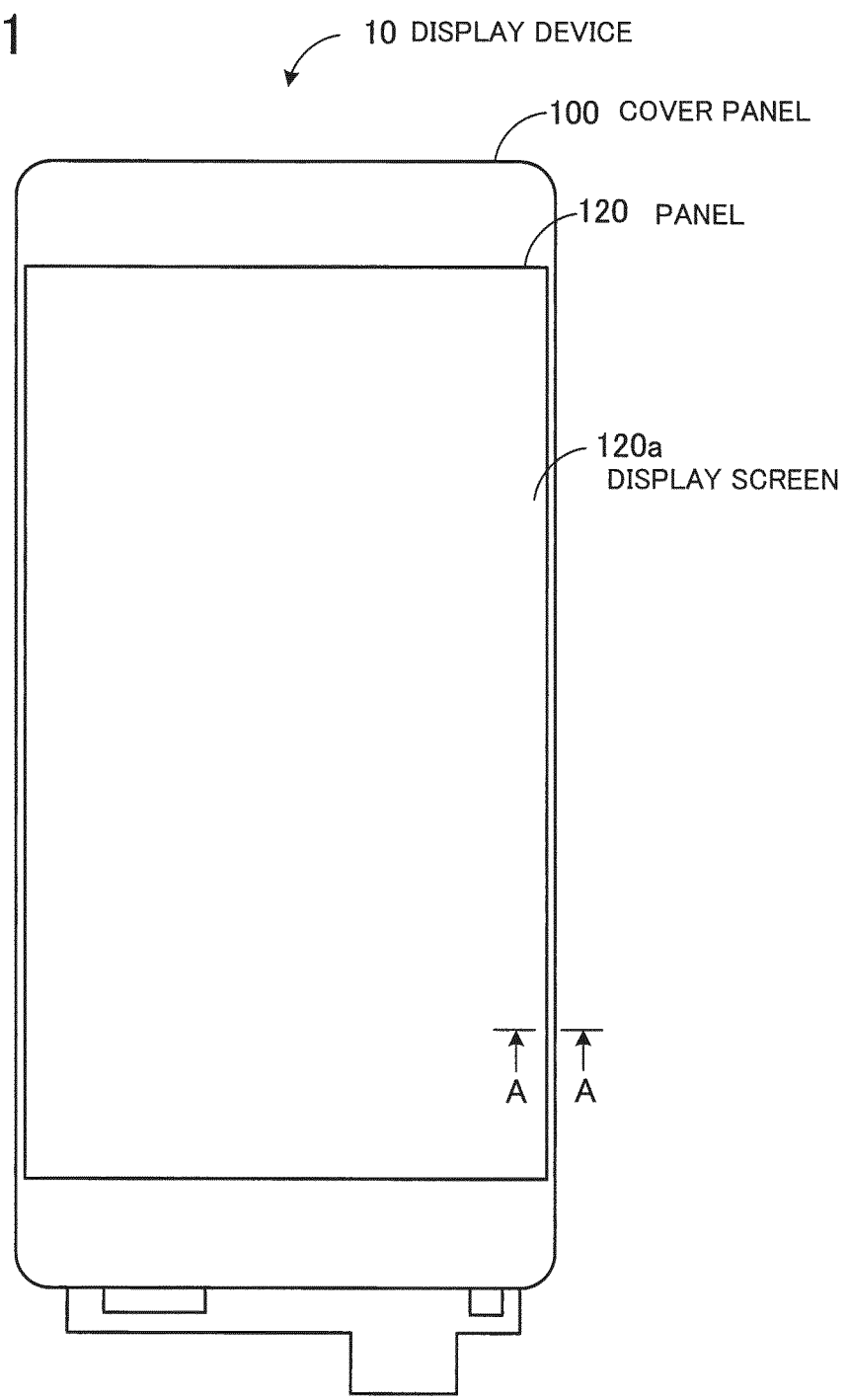
FIG. 1 is a plan view of a display device in a first embodiment.

Several embodiments will be described below with reference to the accompanying drawings, wherein like reference numerals refer to like elements throughout.

Note that the disclosure is just an example, and as a matter of course the scope of the present embodiments includes alteration that the skilled person can easily conceive of as appropriate without deviating from the spirit of the embodiments. Also, in order to make the description clearer, the drawings are depicted schematically with regard to width, thickness, shape, etc. of each component, as compared with an actual form, but the drawings are just an example and do not limit the interpretation of the present embodiments.

Also, in the present embodiments and the drawings, the same elements as those described with reference to aforementioned drawings are denoted with the same reference signs, and their detailed description is omitted as appropriate in some cases.

First Embodiment

Figure 2:
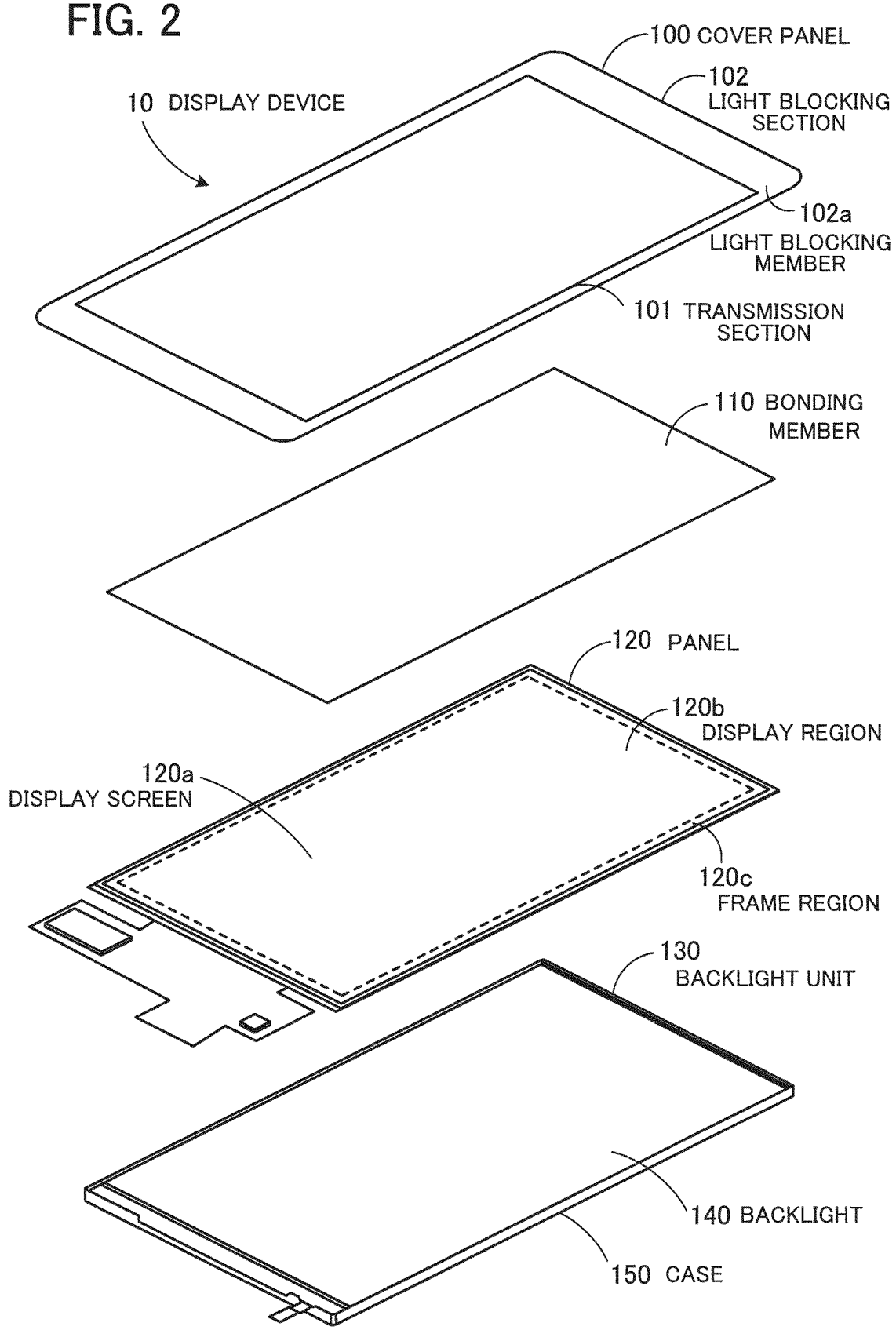
FIG. 2 is an exploded perspective view of a display device in the first embodiment.

First, a display device of a first embodiment will be described. FIG. 1 is a plan view of a display device in the first embodiment, which is seen from a front surface (a surface for displaying an image) side. FIG. 2 is an exploded perspective view of the display device in the first embodiment. Note that, in the following description, a front surface of each component faces toward a direction in which the display device displays an image (upward of FIG. 2), and a back surface is an opposite side (downward of FIG. 2) to the front surface.

As illustrated in FIG. 2, a display device 10 is a transmissive display device that includes a cover panel 100, a bonding member 110, a liquid crystal panel (panel, hereinafter) 120, and a backlight unit 130.

A glass plate of the cover panel 100 is formed into a rectangular shape with four round corners and covers and protects a display screen 120a which is a front surface of the panel 120. Also, the cover panel 100 is sized such that a periphery (outer edge) of the cover panel 100 protrudes outwardly from a periphery of the panel 120 in the plan view.

The cover panel 100 includes a transmission section 101 and a frame-shaped light blocking section 102 that surrounds a periphery of the transmission section 101. The transmission section 101 is a region that faces a display region 120b of the panel 120 and allow light to transmit therethrough. The light blocking section 102 is a region formed and provided with a light blocking member 102a for blocking light at a back surface side of the glass plate. Note that the light blocking section 102 is also referred to as a frame region of the display device 10. Note that the light blocking member 102a may be formed at a front surface side of the glass plate.

The bonding member 110 bonds the cover panel 100 to the display screen 120a of the panel 120. The bonding member 110 has high transparency and bonding property (adherence property) and is an ultraviolet curable resin (UV resin) for example. The bonding member 110 is formed in a rectangular shape in the plan view.

The panel 120 is a flat plate display device that displays an image, and includes a display region 120b that displays an image and a frame region 120c that surrounds a periphery of the display region 120b. The panel 120 has a transmission display function for displaying (forming) an image on the display screen 120a by selectively transmitting the light from the backlight unit 130 to the display region 120b.

Figure 3:
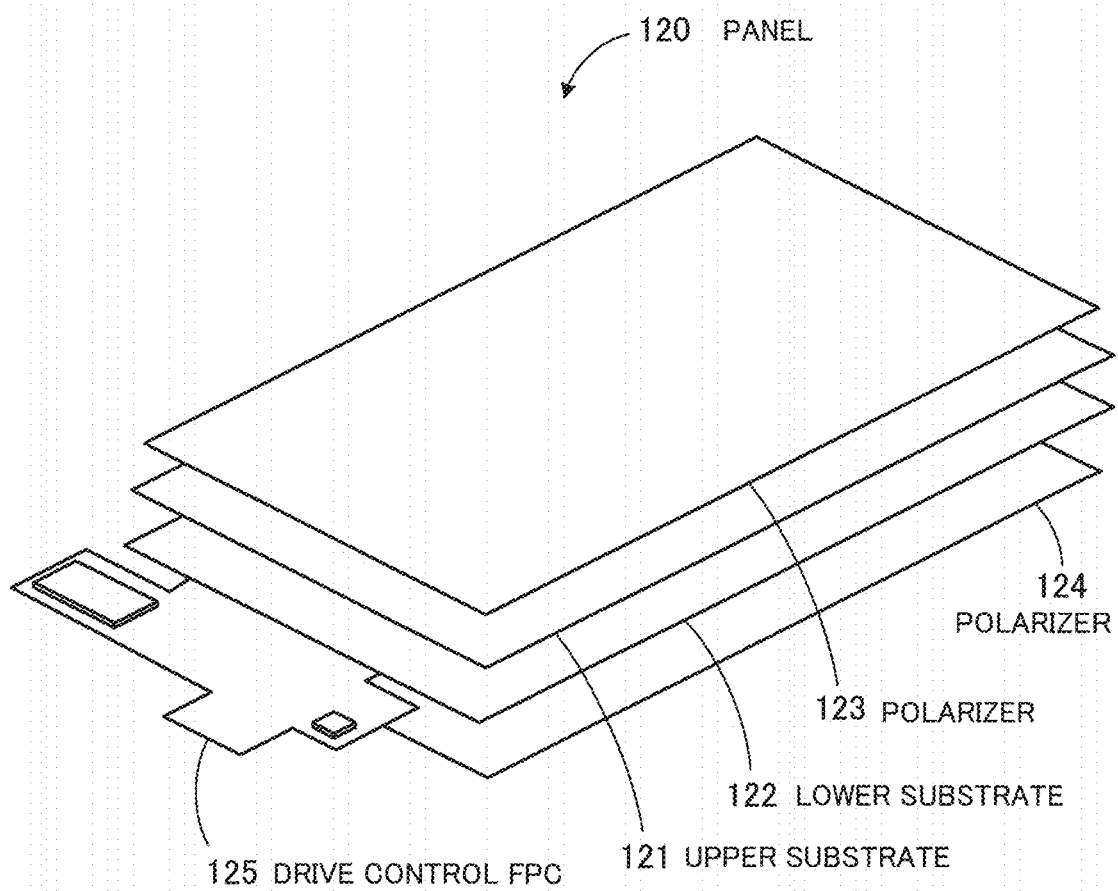
FIG. 3 is an exploded perspective view of a panel in the first embodiment.

Here, the panel 120 will be described more specifically with reference to FIG. 3. FIG. 3 is an exploded perspective view of the panel in the first embodiment.

The panel 120 operates in a main display mode that is a lateral electric field mode that utilizes a lateral electric field substantially parallel to a substrate main surface. Note that the panel 120 may be configured to mainly operate in a vertical electric field mode that utilizes a vertical electric field substantially perpendicular to the substrate main surface.

The panel 120 includes an upper substrate 121, a lower substrate 122, a polarizer 123, a polarizer 124, and a drive control flexible printed circuit (FPC) 125.

The upper substrate 121 and the lower substrate 122 are a pair of substrates that sandwich a liquid crystal. The upper substrate 121 is a rectangular flat plate on which color filters of red (R), green (G), and blue (B) are formed corresponding to pixels. The lower substrate 122 is a rectangular flat plate on which thin-film transistors are formed.

The polarizer 123 is located at an upper surface side (front surface side) of the upper substrate 121 and is attached to the upper substrate 121 to polarize the light emitted from the panel 120. The polarizer 124 is located at a lower surface side (back surface side) of the lower substrate 122 and is attached to the lower substrate 122 to polarize the light from the back light unit 130.

The drive control FPC 125 is a circuit substrate provided with a semiconductor element such as an IC chip, and supplies a signal for driving the panel 120. The drive control FPC 125 is attached to the lower substrate 122 and extends outwardly from an edge of the lower substrate 122 in the plan view. In accordance with the signal supplied from the drive control FPC 125, the panel 120 selectively transmits the light from the backlight unit 130 to the display region 120b and displays an image on the display screen 120a. The description continues with reference to FIGS. 1 and 2 again.

The backlight unit 130 is located at a back surface side of the panel 120 and outputs light to the display region 120b on the back surface of the panel 120. The backlight unit 130 includes a backlight 140 that outputs light and a case 150 formed of metal (light blocking member) for containing the backlight 140.

Figure 4:
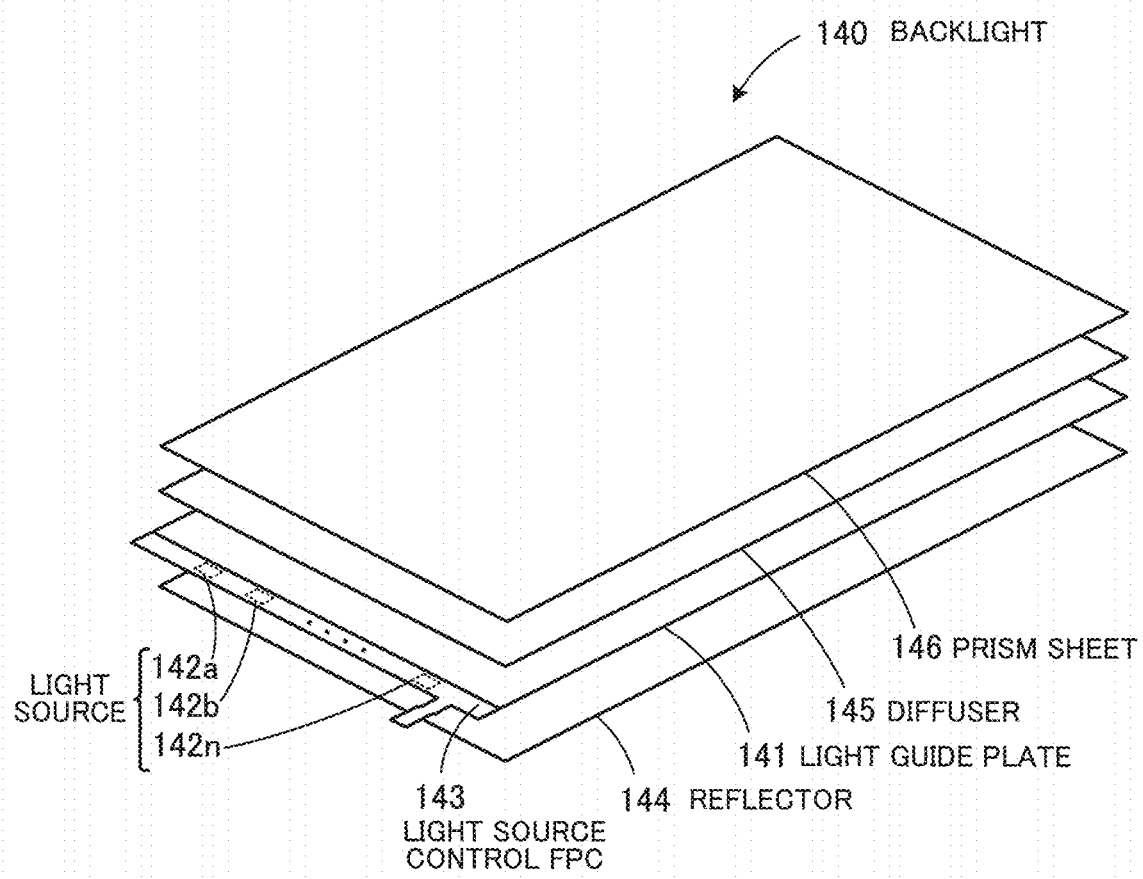
FIG. 4 is an exploded perspective view of a backlight in the first embodiment.
Figure 5:
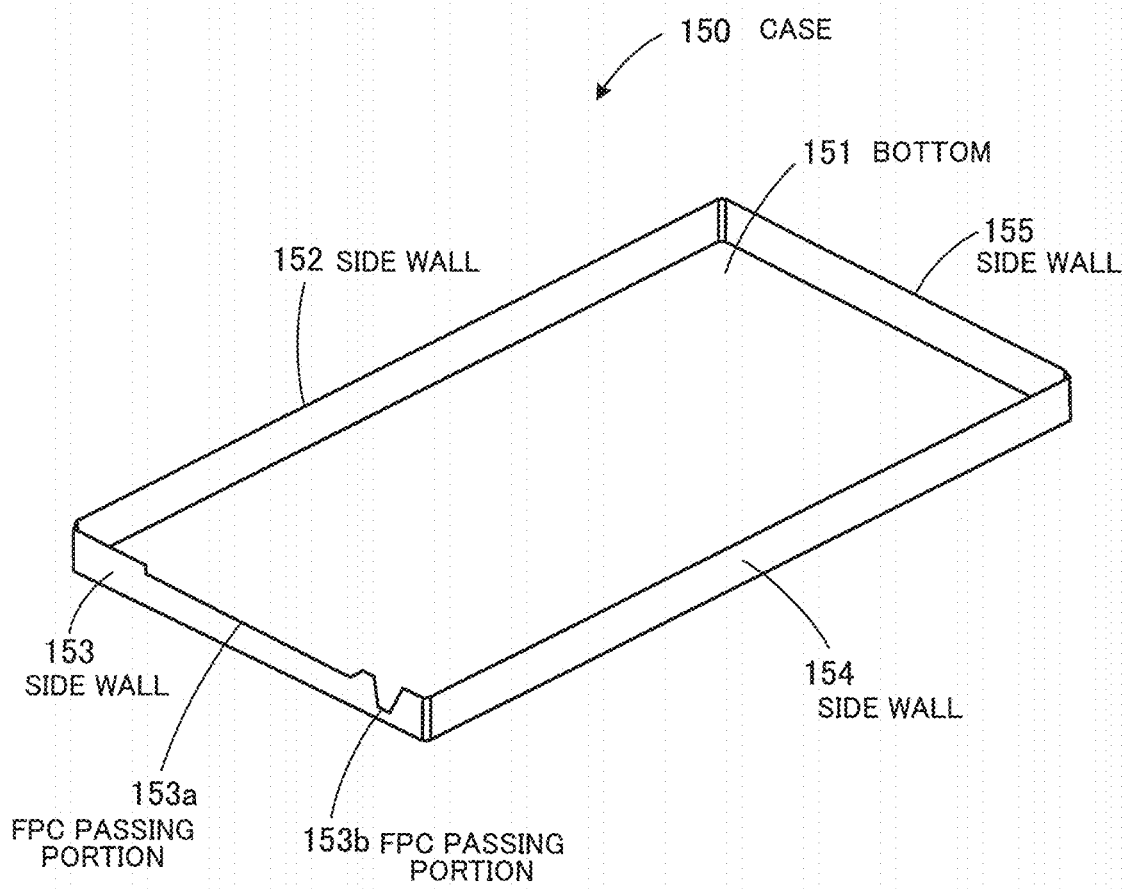
FIG. 5 is a perspective view of a case in the first embodiment.

Here, the backlight 140 and the case 150 will be described specifically with reference to FIGS. 4 and 5. FIG. 4 is an exploded perspective view of the backlight in the first embodiment. FIG. 5 is a perspective view of the case in the first embodiment.

As illustrated in FIG. 4, the backlight 140 includes a light guide plate 141, light sources 142a, 142b, . . . , 142n, a light source control FPC 143, a reflector 144, a diffuser 145, and a prism sheet 146.

The light guide plate 141 is rectangular in the plan view and diffuses the light that has entered from one side face (hereinafter, referred to as light entrance surface) among four side faces and outputs uniform light from a front surface (hereinafter, referred to as light output surface) toward the back surface of the panel 120. The light is output toward the panel 120 and enters the panel 120 from the back surface. Note that the light entrance surface is provided at the side at which the drive control FPC 125 of the panel 120 is located at the time of assembly.

The light sources 142a, 142b, . . . 142n are located on the light source control FPC 143 along the light entrance surface and emits light toward the light entrance surface. The light sources 142a, 142b, . . . , 142n are light emitting diodes (LEDs).

The light source control FPC 143 is a circuit substrate that extends along the light entrance surface of the light guide plate 141 and supplies signals to drive the light sources 142a, 142b, . . . , 142n. A part of the light source control FPC 143 protrudes toward the opposite side to the light entrance surface in the plan view. The protruding part extends outwardly from the case 150 that is containing the backlight 140. In accordance with the signal supplied from the light source control FPC 143, the backlight 140 controls the light sources 142a, 142b, . . . , 142n to adjust the light that enters the light guide plate 141, and radiates the light of desired intensity on the back surface of the panel 120.

The reflector 144 is located at the back surface side of the light guide plate 141 and covers the entire surface of the back surface. The reflector 144 has functions such as reflection, diffusion, and scattering and returns the light from the back surface side of the light guide plate 141 to the light guide plate 141. Thereby, the light that has entered the light guide plate 141 from the light sources 142a, 142b, . . . , 142n can be utilized efficiently and contribute to improve the brightness of the light emitted from the backlight 140.

The reflector 144 is foamed polyethylene terephthalate (PET), for example. Note that a silver vapor deposition film, a multilayer reflection film, a white PET, or the like can be used as the reflector 144.

The diffuser 145 is a transmissive optical member located at the light output surface side of the light guide plate 141 and adjusts an optical property of the light from the light guide plate 141. The prism sheet 146 is a transmissive optical member located at the front surface side of the diffuser 145 and adjusts an optical property of the light that has transmitted through the diffuser 145. Note that the diffuser 145 and the prism sheet 146 are examples of the optical sheet that adjusts the optical property of the light emitted from the light output surface of the light guide plate 141.

Next, the case 150 will be described. As illustrated in FIG. 5, the case 150 has a rectangular box shape and includes a bottom 151 and side walls 152 to 155.

The bottom 151 is positioned at the back surface side of the backlight 140 when the backlight 140 is contained. The bottom 151 is rectangular in the plan view. The bottom 151 is sized slightly larger than the backlight 140 and the panel 120 and smaller than the cover panel 100 in the plan view.

The side walls 152 to 155 stand at the periphery of the bottom 151 and are formed along the entire periphery of the bottom 151. More specifically, the side walls 152 and 154 are formed along the entire long edges of the bottom 151. The side walls 153 and 155 are formed along the entire short edges of the bottom 151.

The heights from the bottom 151 of the side walls 152 to 155 are slightly larger than the sum of the thickness of the backlight 140 and the thickness of the panel 120.

The side wall 153 includes the FPC passing portion 153a and the FPC passing portion 153b. The FPC passing portion 153a is formed in a stepwise manner at an opposite side of the side wall 153 to the bottom 151 (in a recessed manner toward the bottom in a part of the side wall 153). The FPC passing portion 153a allows the drive control FPC 125 to extend therethrough to the outside of the case 150. The FPC passing portion 153b is formed in a stepwise manner at the opposite side of the side wall 153 to the bottom 151 (in a recessed manner toward the bottom in a part of the side wall 153). The FPC passing portion 153b allows the light source control FPC 143 to extend therethrough to the outside of the case 150.

Also, these FPC passing portions 153a and 153b may be formed as openings that are formed in a part of the side wall 153 or from the side wall 153 to the bottom 151.

Note that the backlight unit 130 and the panel 120 are located in this order at the front surface side of the bottom 151 of the case 150, and thus the FPC passing portion 153b is formed deeper than the FPC passing portion 153a.

Figure 6:
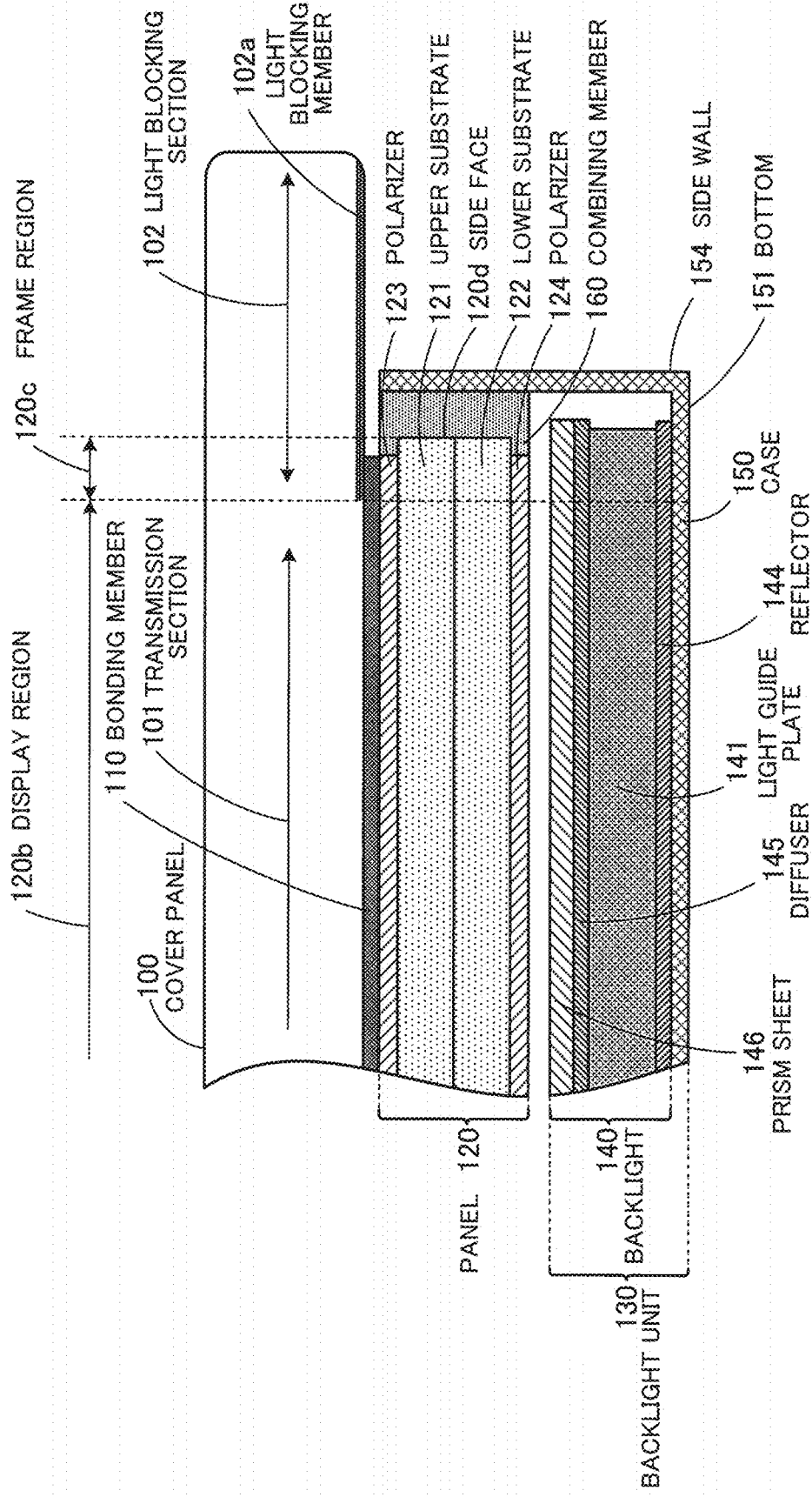
FIG. 6 is a partial cross-sectional view of a display device in the first embodiment.

Next, a cross-sectional structure of the display device will be described. FIG. 6 is a partial cross-sectional view of the display device in the first embodiment and illustrates an A-A cross-sectional view of the display device illustrated in FIG. 1.

As illustrated in FIG. 6, the side wall 154 of the case 150 faces the side face 120d of the panel 120 in the display device 10. Moreover, a combining member 160 is provided in a gap between the side wall 154 and the side face 120d to combine (join) the panel 120 and the case 150. The combining member 160 is hot-melt curable bonding adhesive that blocks light. Note that the combining member 160 may be thermosetting bonding adhesive, photocurable bonding adhesive, ultraviolet curable bonding adhesive, or the like, instead of the hot-melt curable bonding adhesive.

Figure 7A:
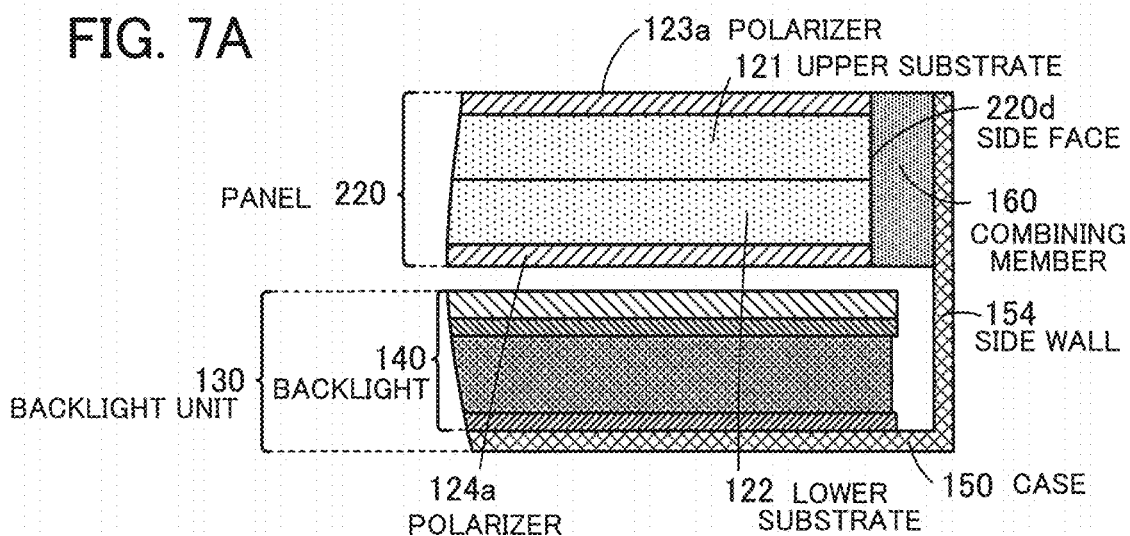
FIGS. 7A to 7C illustrate exemplary variants of a panel in the first embodiment.
Figure 7B:
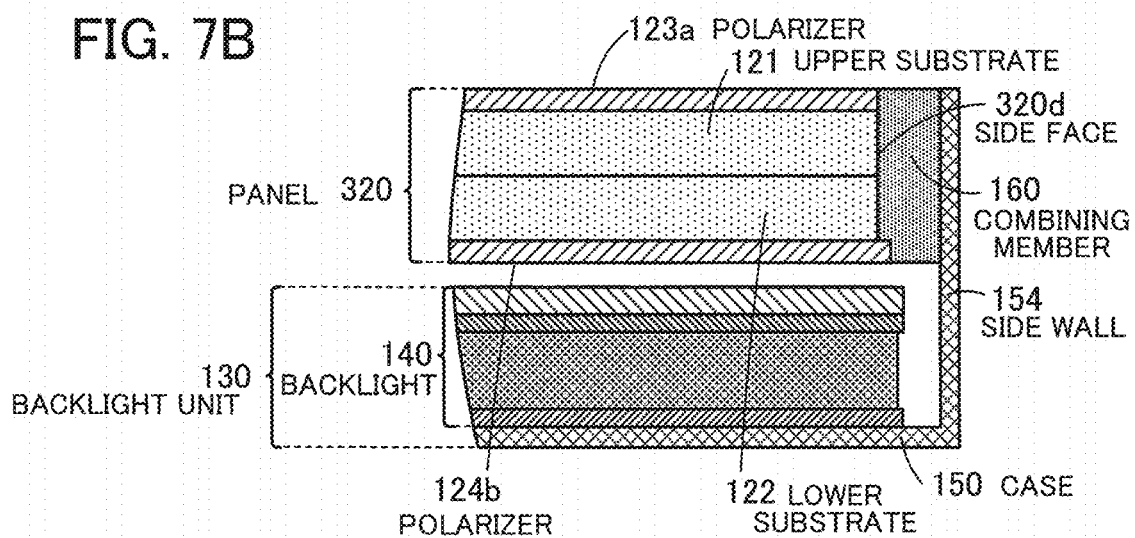
Figure 7C:
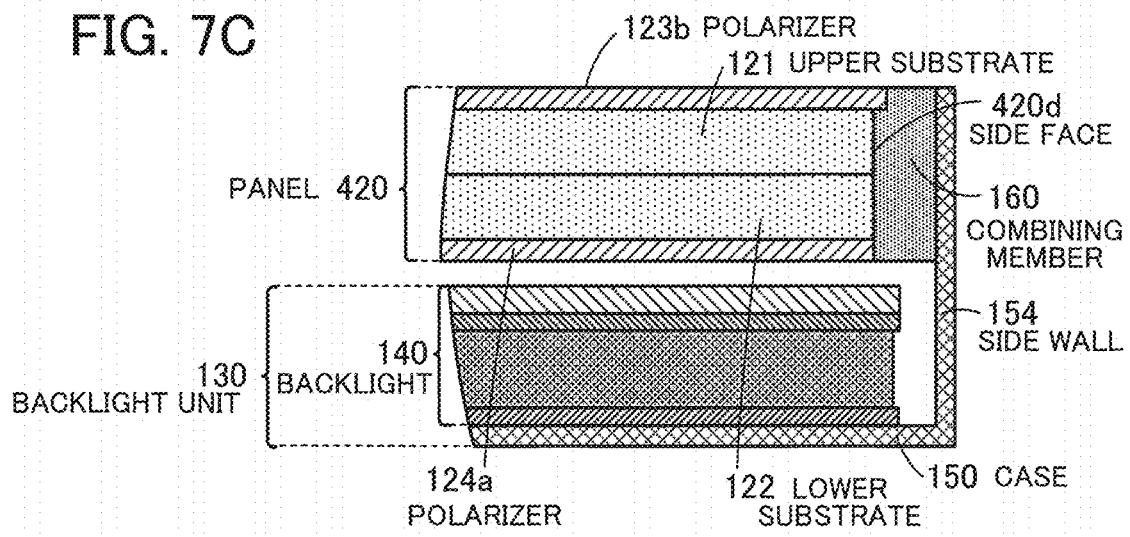

Note that the side face 120d (outer circumferential portion) that extends along the periphery of the display screen 120a includes at least the side faces of the polarizers 123 and 124 and the side faces of the paired substrates 121 and 122, and when the side faces of the polarizers 123 and 124 are away from the side faces of the paired substrates, includes in-between surfaces. For example, in the present embodiment, the side face include a part of the upper substrate 121 in between the side face of the polarizer 123 and the side face of the upper substrate 121, and a part of the lower substrate 122 in between the side face of the polarizer 124 and the side face of the lower substrate 122. Note that, as illustrated in FIGS. 7A to 7C described later, when a polarizer protrudes from the side faces of the paired substrates 121 and 122, the side face of the panel 120 includes a part of the polarizer in between the side face of the polarizer and the side faces of the paired substrates 121 and 122.

Also, the side face (outer circumferential portion) of the backlight 140 includes the side faces of the components of the backlight 140 (in the present embodiment, the prism sheet 146, the diffuser 145, the light guide plate 141, and the reflector 144) and in-between surfaces when these side faces are away from each other. For example, in the present embodiment, the side face includes a part of the diffuser 145 in between the side face of the light guide plate 141 and the side face of the diffuser 145, and a part of the reflector 144 in between the side face of the light guide plate 141 and the side face of the reflector 144.

When the case 150 and the panel 120 are combined at the side face 120d as described above, the distance from the periphery of the display screen 120a to the display region 120b of the panel 120 is made shorter in the display device 10. That is, the display device 10 is configured with the large display region 120b and the narrow frame.

Here, a comparative example in which the back surface of the panel is combined with the case will be described. When the back surface of the panel is combined with the case by providing a frame between the periphery of the back surface side of the panel and the bottom of the case in such a manner that the front surface side of the frame is combined with the panel and the back surface side of the frame is combined with the case, the display device is provided with a combining member at the periphery of the back surface of the panel. Note that a double-faced adhesive tape or the like is used as the combining member provided in the front surface side and the back surface side of the frame.

If the combining member overlaps the display region in the plan view, the combining member is recognized by a person who looks into the display region, and it is concerned to affect the display quality. Hence, it is not preferable to locate the combining member at a part that overlaps the display region. Thus, when the back surface of the panel is combined with the case, a part of the display screen corresponding to the location of the combining member is used as the frame region (non-display region).

That is, when the back surface of the panel is fixed to the case, the display region is set inside the part corresponding to the location of the combining member. Also, in order to achieve a predetermined combining strength, the display device needs to have a combining member of a certain width or more, and it is difficult to reduce the width of the combining member to narrow the frame.

On the other hand, the side face 120d of the panel 120 is combined with the case 150 in the display device 10. Hence, the display region 120b can be set without a restriction that the combining member 160 does not overlap the display region 120b as in the above comparative example.

Hence, in this display device 10, the distance from the periphery of the display screen 120a to the display region 120b of the panel 120 is shortened, and it leads to enlarging the display region 120b. That is, the display device 10 has the narrow frame.

Also, the side face 120d of the panel 120 and the side wall 154 of the case 150 are combined by the combining member 160, and thus the light leakage from the gap is curbed in the display device 10. The display device 10 displays an image in the display region 120b by the light output from the backlight 140 and transmitting through the display region 120b. If the light were output from the side face 120d or proceeded to the gap between the side face 120d and the side wall 154 without entering the panel 120, the light would leak from the gap. As a result, it would be concerned to affect the display, exterior appearance, etc.

To prevent this, in the display device 10, the side face 120d of the panel 120 and the side wall 154 of the case 150 are entirely combined by the combining member 160. More specifically, the gap between the case 150 and the side wall 154 is filled by the light blocking combining member 160. Hence, even when the light reaches the side face 120d, the light leakage is prevented by the combining member 160. Also, in the display device 10, the side face 120d and the side wall 154 are combined by using the combining member 160, and thus even when the light reaches the gap between the side face 120d and the side wall 154, the light leakage is prevented by the combining member 160. In particular, the light blocking bonding adhesive is used as the combining member 160 in the display device 10, and thus the light leakage is prevented unfailingly.

Also, the display device 10 is provided with the combining member 160 in the gap between the side face 120*d* and the side wall 154, and thereby the side face 120*d* is shielded (protected) with the combining member 160 to improve its impact resistance.

Further, in the display device 10, the gap between the side face 120*d* and the side wall 154 is covered by combining the side face 120*d* and the side wall 154, thereby preventing entry of dust and moisture to improve its reliability.

Also, the display device 10 uses the hot-melt curable bonding adhesive as the combining member 160 to firmly combine the panel 120 and the case 150. As illustrated in FIG. 6, the side face 120*d* is composed of the side faces of a plurality of stacked members, and thus is not flat but includes steps. Specifically, in the display device 10 illustrated in FIG. 6, the side face 120*d* includes the part corresponding to the side faces of the upper substrate 121 and the lower substrate 122 which protrudes from the part corresponding to the side faces of the polarizers 123 and 124.

With regard to this, the display device 10 uses the hot-melt curable bonding adhesive as the combining member 160. The combining member 160 is fitted to the steps (conformed to the steps) and thereafter cured, and thereby the steps are filled with the combining member 160. Also, the steps increases the bonding area, and therefore the display device 10 increases the combining force of the combining member 160 to combine the panel 120 and the case 150 more firmly.

Also, in the display device 10 illustrated in FIG. 6, the backlight 140 faces the panel 120 at the frame region 120*c* via an air gap only. Thereby, light is radiated on the panel 120 from the part of the backlight 140 positioned under the frame region 120*c*, preventing decrease of brightness in the periphery of the display region 120*b* (vicinity of the boundary between the display region 120*b* and the frame region 120*c*) of the display device 10.

Also, as illustrated in FIG. 6, the backlight 140 is contained in the case 150, with the side face of the backlight 140 protruding beyond the side face 120*d* of the panel 120 toward the side wall 154. To configure like this, it is preferable that the size between the long edges of the backlight 140 be larger than the size between the long edges of the panel 120. Thereby, the light from the backlight 140 is radiated even on the periphery of the side face 120*d* of the panel 120, thereby preventing the decrease of the brightness.

Note that the side face 120*d* is joined to the side wall 154 with the combining member 160 in between, and thus a space is provided below the combining member 160. Hence, the side face of the backlight 140 can protrude into the space, and thus in the present embodiment the backlight 140 can be enlarged to an extent that the side face of the backlight 140 overlap the combining member 160 in the plan view. Note that the side face of the backlight 140 faces the side wall 154 through a gap.

Note that the display device 10 is not limited to the above configuration but can employ a configuration in which the side face 120*d* of the panel 120 protrudes beyond the side face of the backlight 140.

Here, a procedure for combining the panel 120 and the side wall 154 will be described. First, bonding adhesive (the combining member 160) that is heated and melted is applied on the side face 120*d*. Thereafter, positioning of the panel 120 and the case 150 is performed by moving the panel 120 to a combined position (hereinafter, a regular position) in the case 150. Thereafter, the bonding adhesive is cooled and solidified, and the panel 120 and the case 150 are combined at the regular position.

As described above, the bonding adhesive is applied on the side face 120*d* in consideration of the steps (for example, more bonding adhesive is applied on a recessed portion than on a protruding portion in advance) in order to prevent generation of a gap between the side face 120*d* and the side wall 154 in the display device 10.

Also, in the display device 10 illustrated in FIG. 6, the backlight 140 is located with a gap between the optical sheets (the prism sheet 146 and the diffuser 145) and the side wall 154. Also, in the display device 10, the combining member 160 is located with a gap between the combining member 160 and the optical sheets.

In general, the optical sheets stretch according to its environment, in some cases. Hence, in the display device 10, a stretchable region is provided between the optical sheets and the side wall 154, and a gap is provided between the combining member 160 and the optical sheets, thereby preventing their contact and ensuring stretch of the optical sheets.

For example, if the optical sheets were combined with the combining member 160 or were in contact with the side wall 154, it would be concerned that the optical sheets warp when stretching. It would be concerned that this warp changes the optical property of the light output from the backlight 140 and affects the display quality.

With regard to this, in the display device 10, the freedom degree of the stretch is ensured by providing the stretchable region, and thereby prevents the warp of the sheets and the adverse effect on the display quality.

Note that, in the display device 10 illustrated in FIG. 6, the gap is provided between the panel 120 and the backlight 140, but this is not a limitation. The panel 120 and the backlight 140 may be in contact with each other. With the panel 120 in contact with the backlight 140, the display device 10 can be made thinner by the size of the gap provided between the backlight 140 and the panel 120.

In this case, it is preferable that a hard coat layer be provided on the back surface of the panel 120 (more specifically, the back surface of the polarizer). With the hard coat layer provided on the back surface of the panel 120, the display device 10 can prevent the prism sheet 146 from damaging the polarizer 124. Thus, in the display device 10, deterioration of the display quality due to the contact between the backlight 140 and the panel 120 is prevented.

Note that the side wall 154 may face only a part of the side face 120*d* in the cross-sectional view. In this case as well, light leakage is prevented by providing the bonding adhesive (the combining member 160) not only between the side face 120*d* and side wall 154, but also at a part that does not face the side wall 154, in the same way as when the side wall 154 faces the entire surface.

However, it is preferable that a tip portion of the side wall 154 that is opposing the bottom 151 extend (protrude) beyond the side face 120*d* to an upper end side (upward of FIG. 6) so as to face the entire surface of the side face 120*d* in the cross-sectional view. In this case, in the display device 10, the entire surface of the side face 120*d* is combined with the side wall 154 by the combining member 160, and thereby the combining strength between the panel 120 and the case 150 is strengthened.

Although the A-A cross section (the right edge part of FIG. 1) of the display device 10 has been described, the upper edge part and the left edge part of FIG. 1 of the display device 10 can be structured in the same way as FIG. 6. Also, a part other than the FPC passing portions 153a and 153b in the lower edge part can be structured in the same way as FIG. 6.

Note that, in general, the left and right edge parts adjacent to the location (lower edge part of FIG. 1) of the drive control FPC 125 and the light source control FPC 143 are desired to be narrow as a frame, and thus only the left and right edge parts may be structured in the same way as FIG. 6.

Note that, in the configuration of the present embodiment, the case 150 is combined with the panel 120, but the backlight 140 is not combined with the case 150 and the panel 120 in any of 3 edges of the frame region excluding one edge of the IC arrangement side. In contrast, a configuration in which the backlight 140 is joined with the case 150 and the panel 120 at one or two edges of the frame region can be employed. This case also employs a configuration in which, at the remaining edges, the side face 120d is joined to the side wall 154 with the combining member 160, and the backlight 140 is not joined to either of the case 150 and the panel 120 as in the present embodiment. Note that a configuration in which each component of the backlight 140 is joined with the case 150 and the panel 120 at the IC arrangement side can be employed.

[First Exemplary Variant]

Next, first exemplary variants will be described with reference to FIGS. 7A to 7C. FIGS. 7A to 7C illustrate exemplary variants of the panel of the first embodiment in partial cross sections corresponding to FIG. 6. Note that cross sections of a part excluding the cover panel 100 and the bonding member 110 are illustrated for simplicity of the drawings.

In a panel 220, illustrated in FIG. 7A, a polarizer 123a and a polarizer 124a are used instead of the polarizers 123 and 124. The polarizer 123a and the polarizer 124a are sized such that the side faces of the polarizer 123a and the polarizer 124a are aligned with the side face of the upper substrate 121 and the side face of the lower substrate 122. Hence, a side face 220d of the panel 220 is composed of the side face of the polarizer 123a, the side face of the polarizer 124a, the side face of the upper substrate 121, and the side face of the lower substrate 122, which are formed planar (flat).

Thereby, the upper substrate 121 and the lower substrate 122 do not overlap the combining member 160 in the plan view, and thus the panel 220 can effectively utilize the light from the backlight 140 even at the vicinity of the side faces of the upper substrate 121 and the lower substrate 122. This prevents the brightness from decreasing at the periphery of the display region (the vicinity of the boundary between the display region and the frame region) in the panel 220.

In a panel 320, illustrated in FIG. 7B, a polarizer 124b is used instead of the polarizer 124a. The polarizer 124b is sized such that the side face of the polarizer 124b protrudes from the side face of the polarizer 123a, the side face of the upper substrate 121, and the side face of the lower substrate 122. Hence, a side face 320d of the panel 320 is composed of the side face of the polarizer 123a, the side face of the upper substrate 121, the side face of the lower substrate 122, a part of the polarizer 124b in between the side face of the lower substrate 122 and the side face of the polarizer 124b, and the side face of the polarizer 124b.

Thereby, the upper substrate 121 and the lower substrate 122 do not overlap the combining member 160 in the plan view, and thus the panel 320 can effectively utilize the light from the backlight 140 even at the vicinity of the side faces of the upper substrate 121 and the lower substrate 122. Also, the side face of the polarizer 124b protrudes, and thus even if the combining member 160 gets onto the back surface side of the polarizer 124b, the upper substrate 121 and the lower substrate 122 are prevented from overlapping the combining member 160 in the plan view. This prevents the brightness from decreasing at the periphery in the panel 320. Further, the polarizer 124b is shaped to bite into the combining member 160 at the side face 320d of the panel 320, and thus the panel 320 increases its contact surface area between the side face 320d and the combining member 160 as well as the combining strength with the case 150.

In a panel 420, illustrated in FIG. 7C, a polarizer 123b is used instead of the polarizer 123a. The polarizer 123b is sized such that the side face of the polarizer 123b protrudes from the side face of the upper substrate 121, the side face of the lower substrate 122, and the side face of the polarizer 124a. Hence, a side face 420d of the panel 420 is composed of the side face of the polarizer 123b, a part of the polarizer 123b in between the side face of the polarizer 123b and the side face of the upper substrate 121, the side face of the upper substrate 121, the side face of the lower substrate 122, and the side face of the polarizer 124a.

Thereby, the upper substrate 121 and the lower substrate 122 do not overlap the combining member 160 in the plan view, and thus the panel 420 can effectively utilize the light from the backlight 140 even at the vicinity of the side faces of the upper substrate 121 and the lower substrate 122. Also, the side face of the polarizer 123b protrudes, and thus even if the combining member 160 gets onto the front surface side of the polarizer 123b, the upper substrate 121 and the lower substrate 122 are prevented from overlapping the combining member 160 in the plan view. This prevents the brightness from decreasing at the periphery portion in the panel 420. Further, the polarizer 123b is shaped to bite into the combining member 160 at the side face 420d of the panel 420, and thus the panel 420 increases its contact surface area between the side face 420d and the combining member 160 as well as the combining strength with the case 150.

Note that other effects which are achieved by the modes described in the present embodiment and are obvious from the description of the present specification or reached by those skilled in the art as appropriate are interpreted as being achieved by the present disclosure as a matter of course.

[Second Exemplary Variant]

Figure 8:
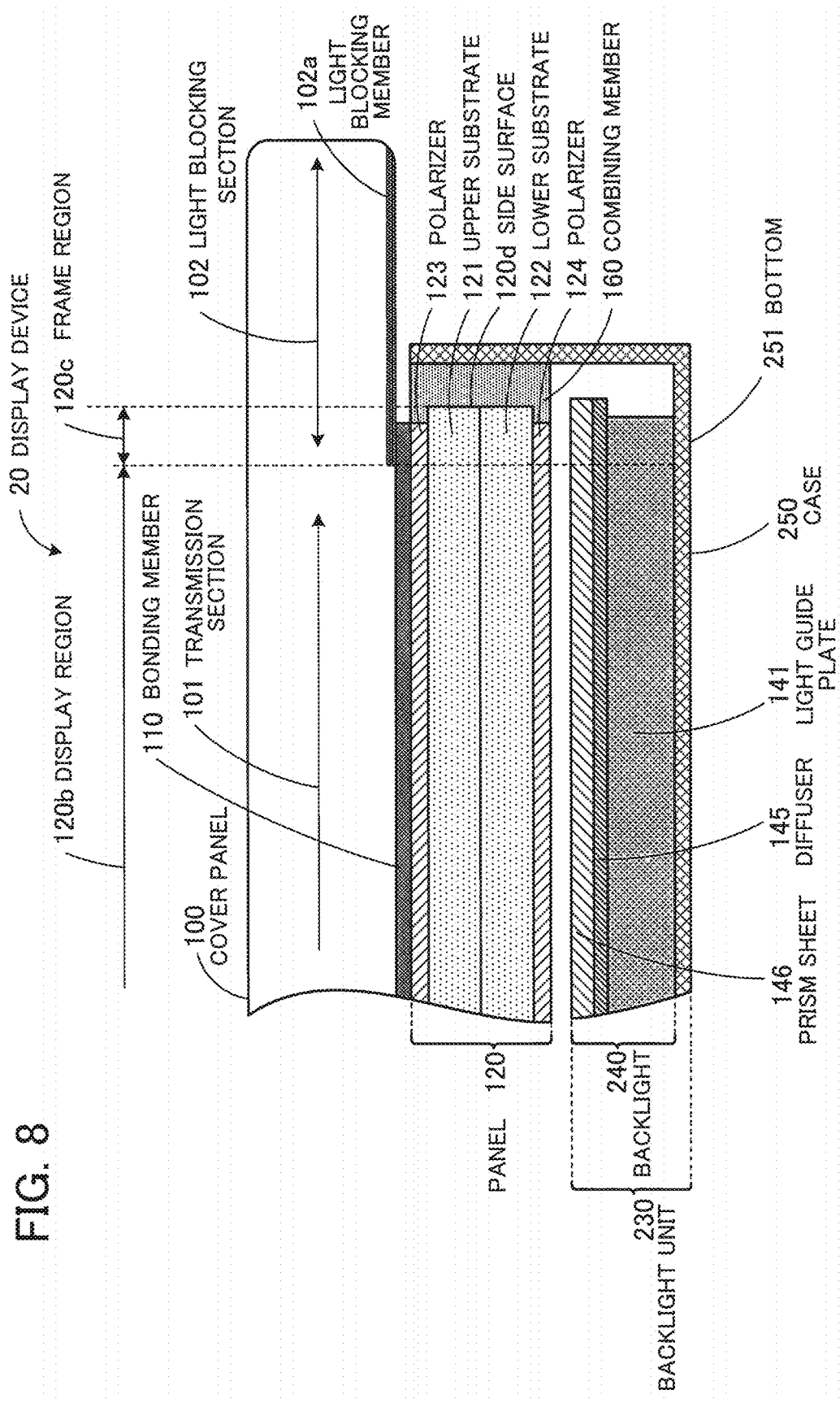
FIG. 8 is a partial cross-sectional view of an exemplary variant of a display device in the first embodiment.

Next, a second exemplary variant will be described with reference to FIG. 8. FIG. 8 is a partial cross-sectional view of an exemplary variant of the display device in the first embodiment and illustrates a partial cross section corresponding to FIG. 6.

As illustrated in FIG. 8, the display device 20 includes a cover panel 100, a bonding member 110, a panel 120, and a backlight unit 230. The backlight unit 230 includes a backlight 240 that is the backlight 140 from which a reflector is removed, and a case 250 formed of a member that reflects light (for example, a reflector). The case 250 is formed by performing a bending process or vacuum forming on a reflector, for example. In the backlight unit 230, the light guide plate 141 of the backlight 240 is located directly on the front surface of the bottom 251.

As described above, the case 250 is formed of the member that reflects light in order to provide a light reflecting function, and the reflector is not located in the backlight 240, so that the display device 20 can be made thinner by the thickness of the reflector.

Although, in the above description, the case 250 is formed in a rectangular box shape by performing a bending process or vacuum forming on the member that reflects light (for example, a reflector) to provide both functions of the case and the reflector, this is not a limitation. For example, the front surface of the bottom 251 may be processed to reflect light (for example, mirror finishing) to provide both functions of the case and the reflector.

Note that other effects which are achieved by the modes described in the present embodiment and are obvious from the description of the present specification or reached by those skilled in the art as appropriate are interpreted as being achieved by the present disclosure as a matter of course.

Second Embodiment

In the first embodiment, the hot-melt curable bonding adhesive is used as the combining member. On the other hand, a double-faced adhesive tape is used in a second embodiment instead of the hot-melt curable bonding adhesive. The second embodiment will be described specifically with reference to FIGS. 9A, 9B, and 10.

Figure 9A:
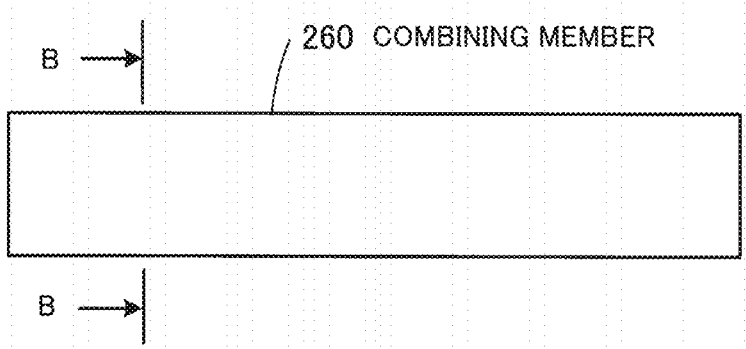
FIGS. 9A and 9B illustrate a combining member in a second embodiment.
Figure 9B:
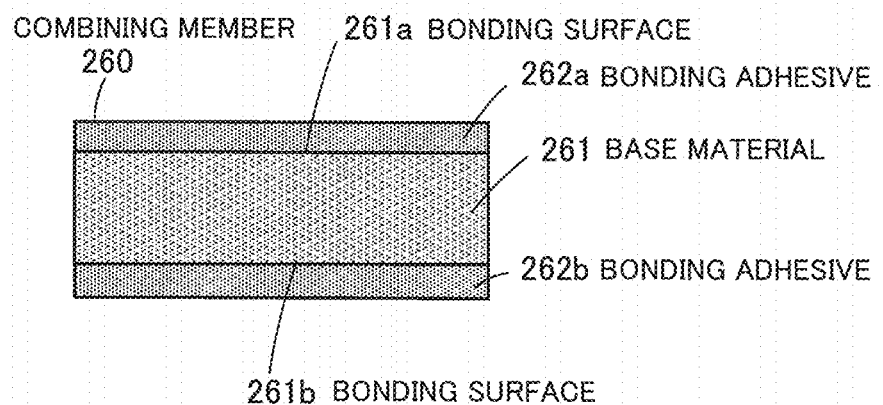
Figure 10:
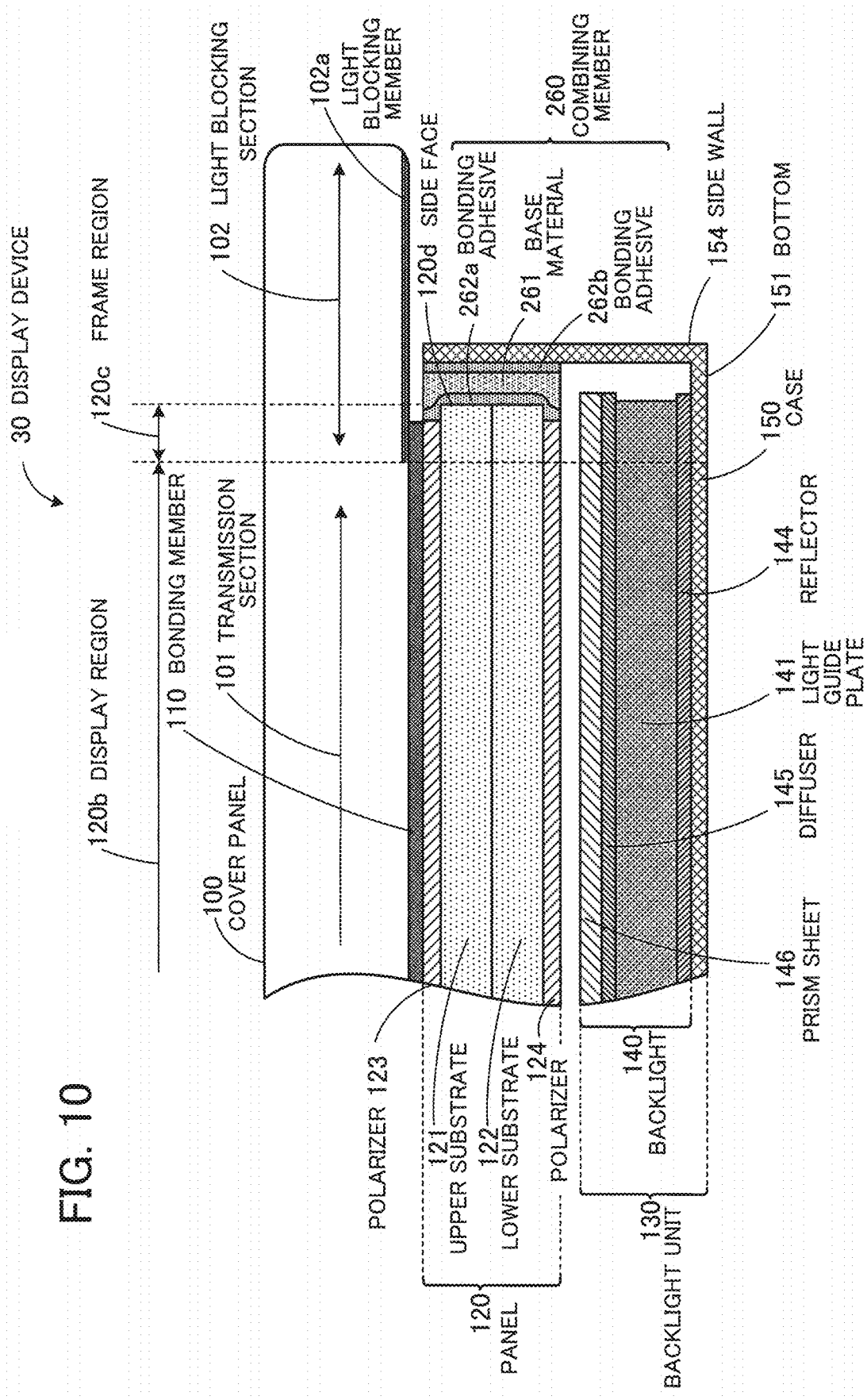
FIG. 10 is a partial cross-sectional view of a display device in the second embodiment.

FIGS. 9A and 9B illustrate a combining member in the second embodiment. FIG. 9A is a plan view of a bonding surface of the combining member seen from a normal direction, and FIG. 9B is a B-B cross-sectional view. FIG. 10 is a partial cross-sectional view of a display device in the second embodiment and illustrates a partial cross section, corresponding to FIG. 6, of the display device in the second embodiment.

As illustrated in FIG. 9B, a combining member 260 includes a light blocking base material 261, a light blocking bonding adhesive 262*a* applied on a bonding surface 261*a* of the base material, and a light blocking bonding adhesive 262*b* applied on a bonding surface 261*b* of the base material 261. The base material 261 has a cushioning property and is transformable acrylic foam. Note that urethane foam, a member that expands with moisture absorption, a member that expands with heat, and the like may be used as the transformable base material having a cushioning property, for example.

Although the base material 261 and the bonding adhesives 262*a* and 262*b* block light, the combining member 260 as a whole may block light. Specifically, any one of the base material 261 and the bonding adhesives 262*a* and 262*b* is needless to block light.

As illustrated in FIG. 10, a display device 30 is configured such that the side face 120*d* and the side wall 154 are combined by using the combining member 260. When the side face 120*d* and the side wall 154 are combined with the combining member 260, a part of the base material 261 corresponding to the upper substrate 121 and the lower substrate 122 of the panel 120 is dented with elastic deformation.

As described above, the base material 261 of the combining member 260 transforms to change its shape according to the shape of the side face 120*d*, and thus the combining member 260 is located without a gap at the steps in the same way as the first embodiment. Also, the steps enlarge the bonding area, and therefore the combining force of the combining member 260 is increased to combine the panel 120 and the case 150 more firmly. Also, the base material 261 has the cushioning property, and thus the display device 30 can improve its impact resistance.

Here, a combining procedure of the panel 120 and the side wall 154 when a double-faced adhesive tape is used will be described. First, a double-faced adhesive tape is attached to a position on the side wall 154 of the case 150 to which the panel 120 is fixed. Thereafter, the panel 120 is pressed into the case 150 so as to transform the base material 261 according to the shape of the side face 120*d*, and is moved to a regular position in the case 150. Thereafter, the bonding adhesive is solidified to combine the panel 120 and the case 150 at the regular position.

The above is the second embodiment. Note that the same effects as the aforementioned first embodiment can be obtained in the second embodiment as well.

Also, other effects which are achieved by the modes described in the present embodiment and are obvious from the description of the present specification or reached by those skilled in the art as appropriate are interpreted as being achieved by the present disclosure as a matter of course.

Note that the display device described in each embodiment can be integrated and used in various types of electronic devices, such as a smartphone, a tablet terminal, a mobile phone, a notebook PC, a portable game machine, an electronic dictionary, a television device, and a car navigation system.

All examples and conditional language provided herein are intended for the pedagogical purposes of aiding the reader in understanding the invention and the concepts contributed by the inventor to further art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A display device comprising:
   a first substrate having a first main surface and a first side surface intersecting the first main surface,
   a display screen above the first substrate, and
   a combining member on the first side surface,
   wherein the first main surface is located at one of a first side and a second side,
   the first side is a side facing the display screen,
   the second side is an opposite side of the first substrate from the display screen, and
   the combining member is located on a first outer edge part of the first main surface and the first side surface continuously.

2. The display device according to claim 1, further comprising a backlight unit,
   wherein a part of the combining member is located between the first main surface and the backlight unit.

3. The display device according to claim 1, further comprising a backlight unit,
   wherein the first main surface is at an opposite side of the first substrate from the backlight unit.

4. The display device according to claim 1, further comprising a second substrate facing the first substrate,
   wherein the second substrate has a second main surface and a second side surface intersecting the second main surface, and
   the combining member is located on the first side surface and the second side surface continuously.

5. The display device according to claim 1, wherein a first polarizer is on the first main surface, and
   the combining member is in contact with the first polarizer.

6. The display device according to claim 5, wherein the first polarizer has a third main surface and a third side surface, the third main surface is at an opposite side of the first polarizer from the first substrate, and the combining member is in contact with the third side surface, and is not in contact with the third main surface.

7. The display device according to claim 1, further comprising a case containing the first substrate, wherein the case includes a bottom and a side wall, the side wall faces the first side surface, and the combining member attaches the first substrate to the side wall.

8. The display device according to claim 7, wherein an air gap is located between the combining member and the bottom of the case.

9. The display device according to claim 1, wherein the combining member is a bonding adhesive.

10. The display device according to claim 1, wherein the combining member is a double-faced adhesive tape.

11. The display device according to claim 1, further comprising an optical sheet, wherein a main surface of the optical sheet has a portion overlapping with the combining member in a plan view and not overlapping with the first substrate in a plan view.

12. A display device comprising:

a first substrate having a first main surface and a first side surface intersecting the first main surface, a display screen above the first substrate, and a combining member on the first side surface, wherein the first main surface is located at one of a first side and a second side, the first side is a side facing the display screen, the second side is an opposite side of the first substrate from the display screen, and the combining member is located on the first side surface and a part of the first main surface continuously.

13. The display device according to claim 12, further comprising a backlight unit, wherein a part of the combining member is located between the first main surface and the backlight unit.

14. The display device according to claim 12, further comprising a backlight unit, wherein the first main surface is at an opposite side of the first substrate from the backlight unit.

15. The display device according to claim 12, further comprising a second substrate facing the first substrate, wherein the second substrate has a second main surface and a second side surface intersecting the second main surface, and the combining member is located on the first side surface and the second side surface continuously.

16. The display device according to claim 12, further comprising an optical sheet, wherein a main surface of the optical sheet has a portion overlapping with the combining member in a plan view and not overlapping with the first substrate in a plan view.

* * * * *